US009516519B2

(12) United States Patent
Ahuja (10) Patent No.: US 9,516,519 B2
(45) Date of Patent: Dec. 6, 2016

(54) METHODS AND SYSTEMS OF INTERNET PROTOCOL OPTIMIZATION FOR CELLULAR DATA NETWORKS

(71) Applicant: Chetan Ahuja, Burlingame, CA (US)

(72) Inventor: Chetan Ahuja, Burlingame, CA (US)

( * ) Notice: Subject to any disclaimer, the term of this patent is extended or adjusted under 35 U.S.C. 154(b) by 0 days.

(21) Appl. No.: 14/510,641

(22) Filed: Oct. 9, 2014

(65) Prior Publication Data

US 2015/0245224 A1 Aug. 27, 2015

Related U.S. Application Data

(60) Provisional application No. 61/944,401, filed on Feb. 25, 2014.

(51) Int. Cl.
*H04W 24/00* (2009.01)
*H04W 24/02* (2009.01)
*H04W 64/00* (2009.01)
*H04L 29/08* (2006.01)
*H04L 29/06* (2006.01)
*H04W 4/02* (2009.01)

(52) U.S. Cl.
CPC .......... *H04W 24/02* (2013.01); *H04L 67/2823* (2013.01); *H04L 69/08* (2013.01); *H04W 4/023* (2013.01); *H04W 64/00* (2013.01)

(58) Field of Classification Search
None
See application file for complete search history.

(56) References Cited

U.S. PATENT DOCUMENTS

| 2001/0032254 | A1* | 10/2001 | Hawkins | ............. | G06F 17/3089 |
| | | | | | 709/219 |
| 2006/0106944 | A1* | 5/2006 | Shahine | ............... | G06Q 20/382 |
| | | | | | 709/245 |
| 2011/0153938 | A1* | 6/2011 | Verzunov | ............. | G06F 9/5083 |
| | | | | | 711/118 |
| 2014/0304502 | A1* | 10/2014 | Su | .......................... | H04W 4/02 |
| | | | | | 713/154 |

* cited by examiner

*Primary Examiner* — Erika Washington (57) ABSTRACT

In one aspect, a method includes detecting that a mobile device application in a mobile device has generated a TCP based protocol request. The TCP based protocol request is automatically converted by the mobile device to a cellular-data network protocol request with the mobile device application. Two or more IP proxy servers are identified. Wherein the two or more IP proxy servers provide internet access to a mobile device via a cellular data network. A list of physical locations of each of the two or more IP proxy servers is generated. A location of the mobile device is calculated. A distance between the mobile device and each of the two or more IP proxy servers is automatically determined. A step includes selecting a physically nearest IP proxy server of the two or more internet protocol (IP) proxy servers to the mobile device. A step includes communicating the cellular-data network protocol request to the physically nearest IP proxy server via, at least in part, the cellular data network.

17 Claims, 8 Drawing Sheets

METHODS AND SYSTEMS OF INTERNET PROTOCOL OPTIMIZATION FOR CELLULAR DATA NETWORKS

CROSS-REFERENCE TO RELATED APPLICATIONS

This application is a claims priority from U.S. Provisional Application No. 61/944,401, titled METHODS AND SYSTEMS OF INTERNET PROTOCOL OPTIMIZATION FOR CELLULAR DATA NETWORKS and filed 25 Feb. 2014. This application is hereby incorporated by reference in its entirety.

FIELD OF THE INVENTION

The invention is in the field of computer networks and more specifically to a method, system and apparatus of Internet protocol optimization for cellular data networks.

DESCRIPTION OF THE RELATED ART

The transmission control protocol (TCP) provides a core protocols of the Internet protocol suite (IP). Web browsers use TCP when they connect to servers on the World Wide Web, and it is used to deliver email and transfer files from one location to another. Traditionally, web browsers operated in stationary personal computers. However, it is currently common for users to access the Internet from portable mobile devices (e.g. smart phones, wearable computers, head-mounted computers, etc.). Mobile devices often use cellular data networks. Various TCP protocols may not be optimized for cellular data networks. In view of this, improvements may be made over conventional methods if, for example, a mobile device were able to utilize an Internet protocol optimized for cellular data networks.

BRIEF SUMMARY OF THE INVENTION

In one aspect, a method of an Internet protocol optimization of a cellular data network includes the step of detecting that a mobile device application in a mobile device has generated a transmission control protocol (TCP) based protocol request. A step includes automatically converting the TCP based protocol to a cellular-data network protocol request with the mobile device application. A step includes identifying two or more internet protocol (IP) proxy servers, wherein the two or more IP proxy servers provide internet access to a mobile device via a cellular data network. A step includes generating a list of physical locations of each of the two or more IP proxy servers. A step includes calculating a location of the mobile device. A step includes automatically determining, with at least one processor, a distance between the mobile device and each of the two or more IP proxy servers. A step includes selecting a physically nearest IP pro server of the two or more internet protocol (IP) proxy servers to the mobile device. A step includes communicating the cellular-data network protocol request to the physically nearest IP proxy server (e.g. via, at least in part, the cellular data network or directly to the IP proxy server).

Optionally, the distance between the mobile device and each of the two or more IP proxy servers is determined based on a current time zone used by the mobile device, and wherein a nearest IP proxy server is determined as nearest to the current time zone of the mobile device. The distance between the mobile device and each of the two or more IP proxy servers is determined based on a Global Positioning System (GPS) location of the mobile device, and wherein the nearest IP proxy server is determined as nearest to the current GP location of the mobile device. The distance between the mobile device and each of the two or more IP proxy servers is determined based on a detected local Wi-Fi network location, and wherein the nearest IP proxy server is determined as nearest to the detected local Wi-Fi network location. The physical distance between the mobile device and each of the two or more IP proxy servers can be determined based on an internet protocol (IP) geolocation method that utilizes an IP address of the mobile to determine a city, county or postal code of the mobile device

BRIEF DESCRIPTION OF THE DRAWINGS

The present application can be best understood by reference to the following description taken in conjunction with the accompanying figures, in which like parts may be referred to by like numerals.

The Figures described above are a representative set, and are not an exhaustive with respect to embodying the invention.

DESCRIPTION

Disclosed are a system, method, and article of manufacture of an Internet protocol optimization for cellular data networks. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Cellular data network can be a cellular network that communicates data packets between the Internet and mobile device.

Global Positioning System (GPS) can be a space-based satellite navigation system that provides location and time information in all weather conditions, anywhere on or near the Earth where there is an unobstructed line of sight to four or more GPS satellites. As used herein, GPS can also include various assisted GPS configurations (e.g. Mobile Station Assisted (MSA), Mobile Station Based (MSB), stand alone, MSA hybrid, etc.).

Hypertext Transfer Protocol (HTTP) can be an application protocol for distributed, collaborative, hypermedia information systems.

Internet protocol (IP) proxy server can be a server (e.g. a computer system or an application) that acts as an intermediary for requests from clients (e.g. a mobile device's web browser) in a cellular network seeking resources from other servers.

TCP/HTTP request can be any transmission control protocol (TCP)-based request. For example, it can be an HTTP request. However, in other example embodiments other protocols (e.g. HTTPS, SMTP, POP3, IMAP, SSH, FTP, Telnet and a variety of other protocols are typically encapsulated in a TCP request) can be implemented in lieu of the HTTP protocol.

EXEMPLARY METHODS AND SYSTEMS

Figure 1:
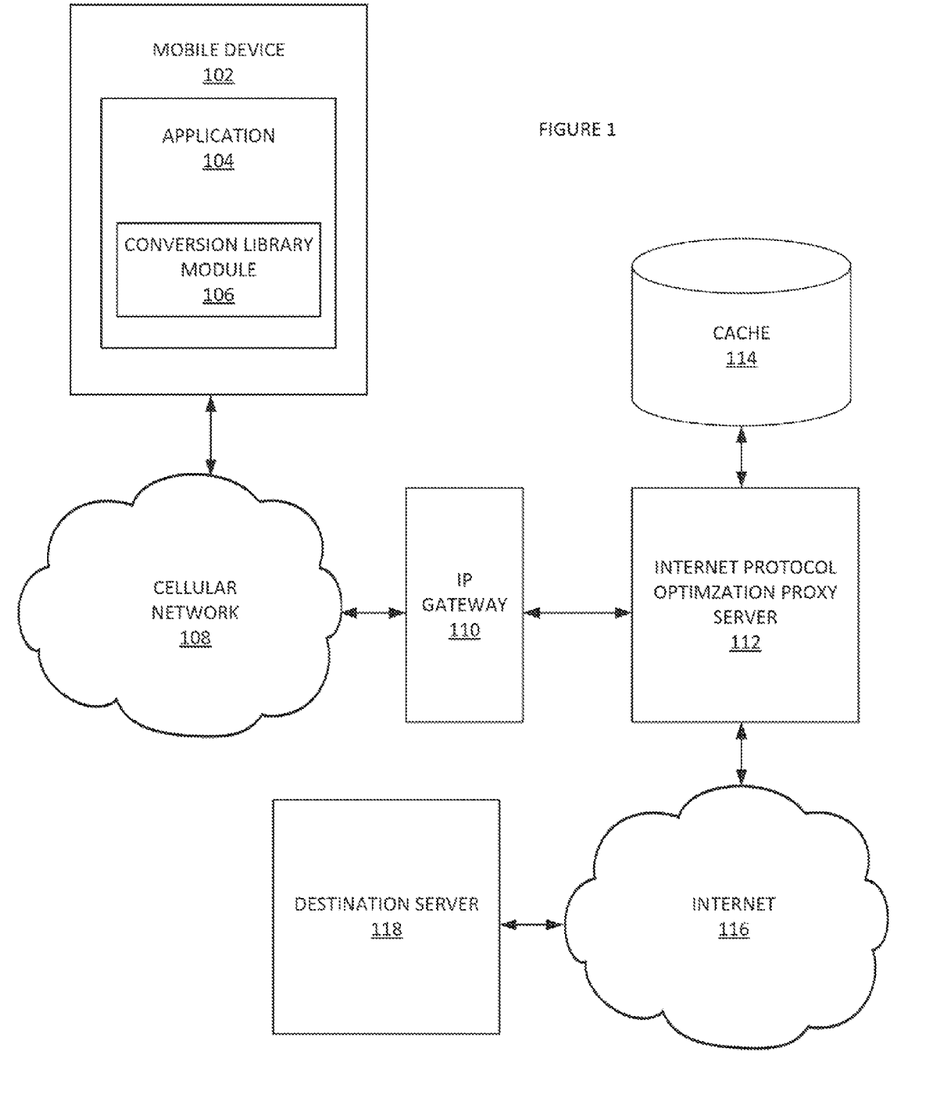
FIG. 1 depicts a system for Internet protocol optimization of cellular data network, according to some embodiments.

FIG. 1 depicts a system 100 for Internet protocol optimization of cellular data network, according to some embodiments. Mobile device 102 can be a handheld computing device such as a smart phone, tablet computer, body-wearable computer (e.g. a 'smart watch', a head-mounted optical display system such as Google Glass®, a handheld game console, a portable navigation system, etc.). More generally, in some embodiments, an computing system that runs applications that communicate with the Internet 116 via a cellular network 108 can operate in system 100 in lieu of mobile device 102. Application 104 (e.g. a 'mobile application', an 'app') can be application software designed to run in mobile device 102.

Cellular network 108 can be a radio network distributed over land areas served by at least one fixed-location transceiver (e.g. a base station). Cellular network 108 can communicate IP data packets between the Internet and mobile device 102 (e.g. as a cellular data network). Accordingly, mobile device 102 can communicate with an Internet-based entity via cellular network 108. Internet protocol (IP) gateway 110 can be an access point for Internet access from cellular network 108. IP gateway 110 can be a router or a proxy server that routes between cellular network 108 and such entities as IP optimization proxy server 112 and/or other Internet-based entities.

Application 104 can include client library module 106. Client library module 106 can convert (e.g. transparently transform) a TCP/HTTP request made by application 104 into a faster protocol optimized for propagation in a radio network such as cellular network 108. Client library module 106 can include a software development kit (SDK) provided by the cellular network optimized protocol system. It is noted that the conversion to the cellular network optimized protocol can be performed without making changes in a server associated with application 104. The conversion can be managed locally at the client-side of application 104.

The cellular network optimized protocol data packets can then be forwarded to IP optimization proxy server 112. As used herein, a proxy server can be a server that acts as an intermediary for requests from clients (e.g. application 104) seeking resources from other servers (e.g. destination server 118). Accordingly, IP optimization proxy server 112 receives the cellular network optimized protocol data packets. IP optimization proxy server 112 can then evaluate the incoming cellular network optimized protocol data packets and communicate with the destination server 118 (e.g. a google-.com web server, an upstream server, a server that provides service to another server, a highest server in a server sequence hierarchy, etc.) of the original TCP/HTTP request. IP optimization proxy server 112 can request the service (e.g. a file, a connection, a web page, other web objects, etc.) designated by the original TCP/HTTP request from the destination server 118. IP optimization proxy server 112 can then serve the request response to application 104. In some embodiments, IP optimization proxy server 112 can also be utilized to push advertisements in the transmission to application 104. Advertisements can be germane to current content subject matter as detected by the IP optimization proxy server 112.

Data from past service requests can be stored in cache 114. Cache 114 can be a mechanism for the temporary storage (e.g. caching) of web documents, such as HTML pages and images. IP optimization proxy server 112 can also manage the settings of client library module 106 and/or a set of enterprise-managed mobile devices that include client library modules. For example, an administrator can enable/disable a particular client library module(s) with IP optimization proxy server 112 (e.g. with a dashboard functionality—not shown). In one example, enablement of client library module 106 can be tied to the identity of the user of the mobile device. In this way, a user of an enterprise's mobile device can log into an application 104 and automatically have client library module 106 enabled.

Administrators can so dynamically select a percentage of mobile devices in the enterprise's system that utilize the cellular network optimized protocol. For example, an administrator can select thirty percent (30%) of the mobile devices owned by her company to use the cellular network optimized protocol for communication in lieu of the TCP/HTTP protocol over a cellular network.

Access to use of the cellular network optimized protocol and elements of system 100 can be provided on a subscription fee basis. Subscriptions can be charged on a per monthly user basis. IP optimization proxy server 112 can include functionalities that collect and provide use information for subscription management and fees services.

It is noted that although the TCP/HTTP protocol is referred to throughout the document can be generalized to any TCP based protocol. For example, in some embodiments, the HTTPS can be used in lieu of and/or supplemental to the TCP/HTTP protocol. In some embodiments, any higher level protocol running on a TCP-based protocol can be replaced by the cellular network optimized protocol for a speed enhancement. Additionally, while the cellular network optimized protocol is designed to be optimized for properties of cellular networks (e.g. high latencies and/or frequent packet drops etc.), its not only the cellular networks that show these properties. A non-cellular example may be a heavily shared Wi-Fi network. Accordingly, the cellular network optimized protocol's methods and systems provided herein can be used to enhance other types of 'suboptimal networks' and/or 'slow, lossy networks'.

Figure 2:
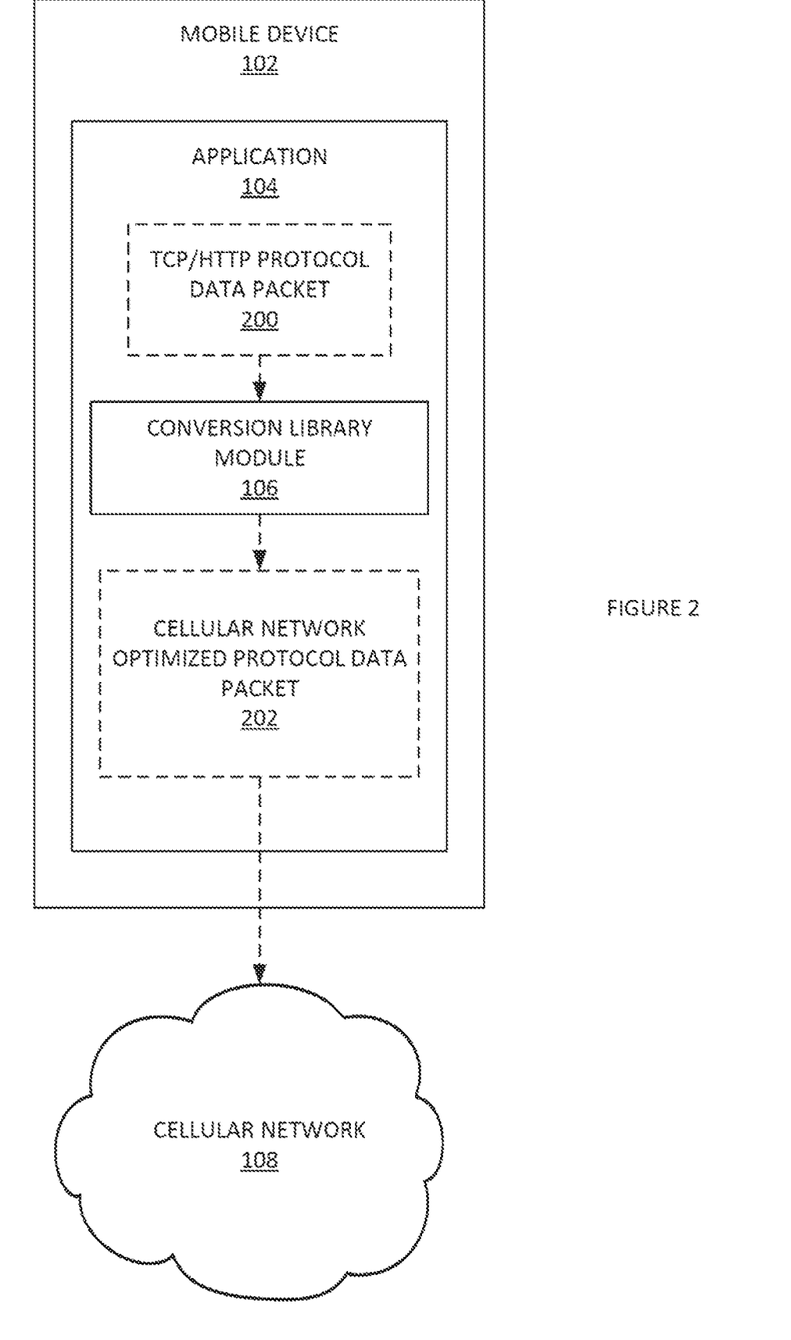
FIG. 2 illustrates an application-side system for transparently transforming a TCP/HTTP protocol-based request to a server with a cellular network optimized protocol-based request, according to some embodiments.

FIG. 2 illustrates an application-side system for transparently transforming a TCP/HTTP protocol-based request to a server with a cellular network optimized protocol-based request, according to some embodiments. Conversion library module 106 can be a client-side software module that comprises a program library implemented in a mobile device application. Conversion library module 106 can transparently (from the perspective of application 104) convert a TCP/HTTP data packet 200 promulgated by application 104 into a cellular network optimized protocol data packet 202. One example of conversion of a TCP/HTTP data packet 200 to a cellular network optimized protocol data packet 202 includes modifying the TCP/HTTP protocol call to a destination server to a cellular network optimized protocol call to a proxy server.

Conversion library module 106 can also determine a nearest (e.g. assessed based on geographical distance) IP optimization proxy server 112 to address the cellular network optimized protocol data packet 202. Conversion library module 106 can include a list of locations of IP optimization proxy servers. The list of IP optimization proxy servers can be periodically updated in conversion library module 106. Conversion library module 106 can obtain the current location of mobile device 102. Conversion library module 106 can calculate the distances from the current location of mobile device 102 and each IP optimization proxy server. Location (e.g. geolocation) can be determined based on various factors such as a current time zone used by the mobile device, a GPS location of the mobile device, a detected Wi-Fi network's location, etc. The optimization proxy server with the minimum distance to the current location of mobile device 102 can be selected. Another method of locating the mobile device can include IP geolocation. For example, based on the IP address of the mobile device, a general location of the mobile device can be located (e.g. to the granularity of a city, post/ZIP code level and/or county).

Figure 3:
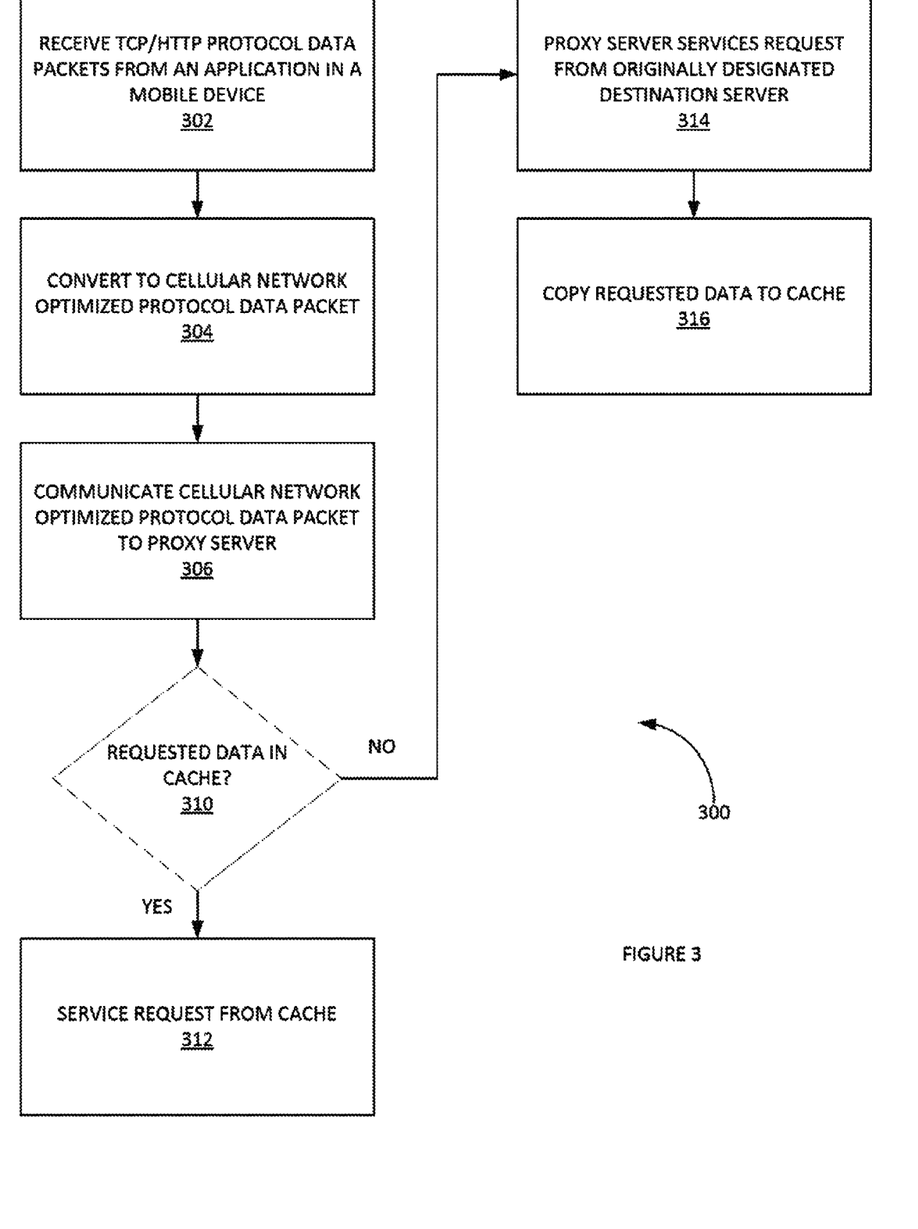
FIG. 3 illustrates an example process of Internet protocol optimization for cellular data networks, according to some embodiments.

FIG. 3 illustrates an example process 300 of Internet protocol optimization for cellular data networks, according to some embodiments. In step 302 of process 300, TCP/HTTP protocol data packets are received from an application in a mobile device. In step 304, the TCP/HTTP protocol data packets are converted to cellular network optimized protocol data Packets. In step 306, cellular network optimized protocol data packets can be communicated to a proxy server (e.g. IP optimization proxy server 112). In step 308, the proxy server can determine if the data requested by the cellular network optimized protocol data packets is in a local cache. If yes, then the requested data is fetched from the local cache and provided to the application in step 310. If no, then the proxy server requests the data from the originally requested destination server (e.g. a server identified in a URL of the original TCP/HTTP request) in step 312. The proxy server can make the request using a TCP/HTTP protocol. The proxy server can provide data from the destination server to the application. In some examples, the proxy server can send the data over a cellular network using the cellular network optimized protocol. The proxy server can also store the data in the local cache for future use.

Optionally, process 300 can determine if the content requested by the application is dynamic or static content. If the content is static content, then process 300 can be implemented. If the content is dynamic content, the process 300 can be modified to eliminate steps 310, 312 and/or 316. The determination can be made based on HTTP header information in a response or other directives from the destination server (e.g. an origin server). Streaming content can be handled in a similar manner.

Figure 4:
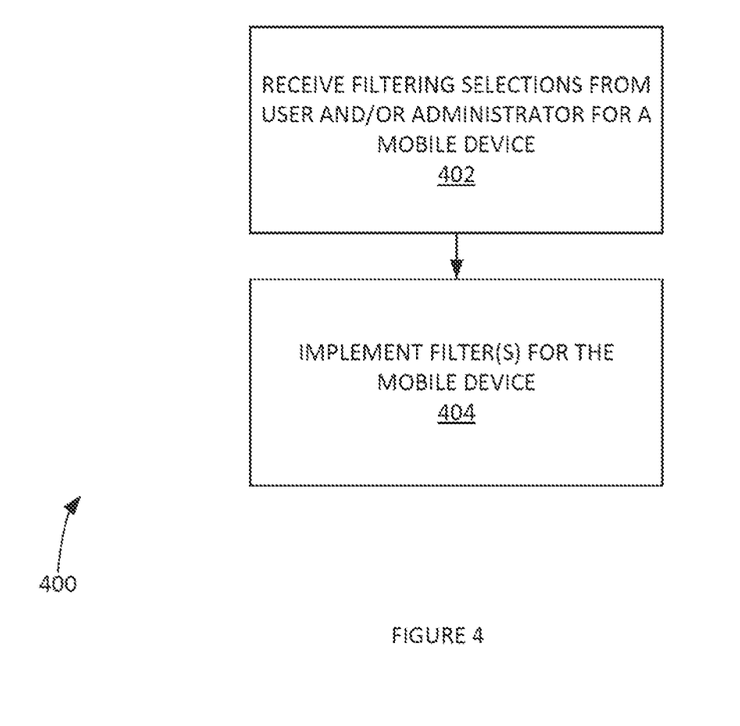
FIG. 4 provides an example process of content filtering, according to some embodiments.

It is noted that in system 100, requests originating in mobile device 102 can include a unique identifier included in the data packet by conversion library module 106. IP optimization proxy server 112 can enable mobile device specific content filtering based on the unique identifier of each mobile device in incoming cellular network optimized protocol requests. For example, some types of selected content can trigger utilization of the cellular network optimized protocol, while other types of content can still utilize a TCP/HTTP protocol. This type of filtering can also be implemented based on other factors such as time of day, location, and/or any combination of factors. FIG. 4 provides an example process 400 of content filtering, according to some embodiments. In step 402 of process 400, filtering instructions from a user and/or administrator are received for a particular mobile device. The filtering instructions can be applied at the proxy server level and/or at the conversion library module level. In step 404, the filter(s) are implemented with respect to the particular mobile device (e.g. based on the mobile device's unique identifier). In one example, a filter can be implemented at the conversion library module level to apply the cellular network optimized protocol for a specific type of media content (e.g. media content associated with a specific artist, web site, genre, media content type, etc.). In another example, a filter can be applied to use the cellular network optimized protocol only during a specified time of day period. These examples are provided by way of instruction and not of limitation. Filters can be applied at the mobile device level and/or at the proxy server level.

It is noted that the request to the proxy server can be associated with an anonymized device identity. This can allow an administrator of the application to set in real time (e.g. assuming processing and networking latency) what percentage of users should have access to the cellular network optimized protocol and/or specific filters. These users can further be broken down into other subsets based on such factors as location, hierarchy in a corporation, historical use of application, etc. This option can also be used for testing purposes as well. A set of device identities can be prioritized (e.g. associated with important users). These prioritized identities can flag the conversion library module to always apply the cellular network optimized protocol regardless of other current filtering instructions.

Figure 5:
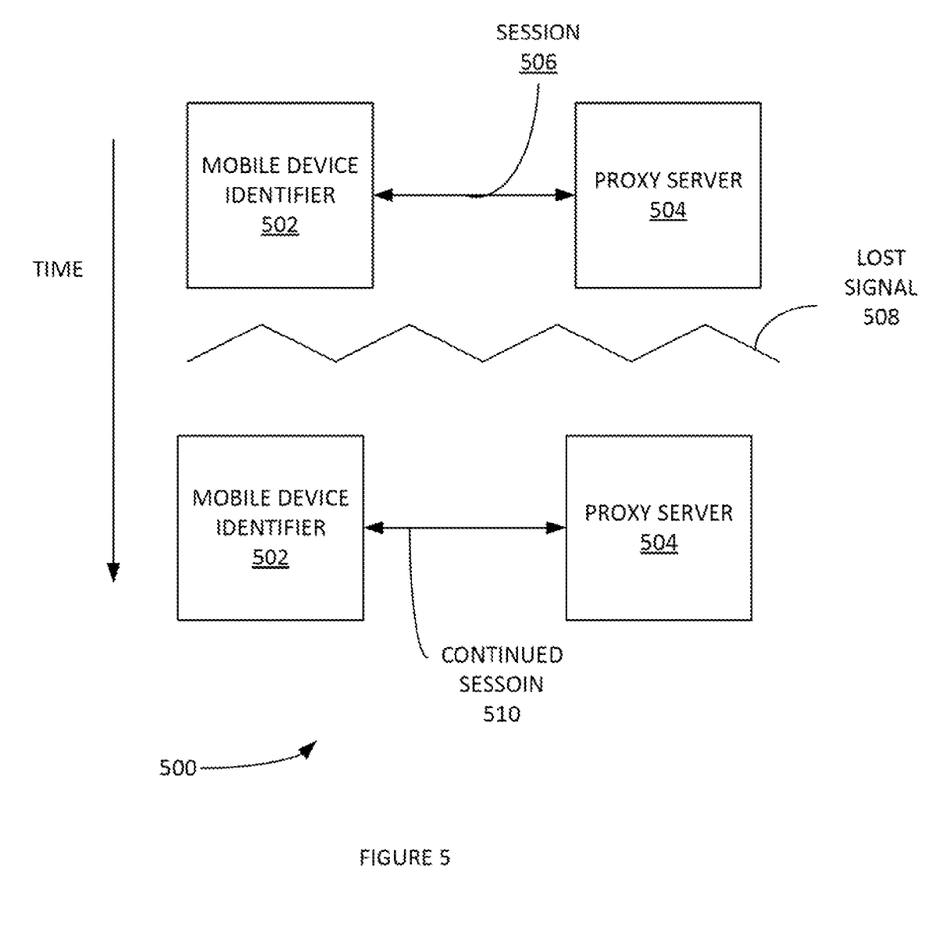
FIG. 5 depicts an example process of session continuation when the session undergoes a temporary break, according to some embodiments.

The device identifier provided by the conversion library module can be used to provide uninterrupted downloading of files to an application in a mobile device even when the mobile device undergoes an IP address change (e.g. when the mobile device changes a location and couples with a new Wi-Fi network, etc.). FIG. 5 depicts an example process 500 of session continuation when the session undergoes a temporary break, according to some embodiments. Mobile device can include a mobile device identifier 502 used in a session 506 with a proxy server 504. Session 506 can suffer a lost signal 508. Rather than creating a new session, a continued session 510 can be implemented as the unique mobile device identifier 502 can enable the proxy server 504 to continue at the point the lost signal 508 occurred.

The cellular network optimized protocol can implement a secure connection without the two round trips required in an HTTPS protocol. For example, a data transfer between a mobile device and a proxy server can be secured via a public key stored on the mobile device. For example, the cellular network optimized protocol public key can be stored in the conversion library module (e.g. by embedding a public key in the SDK). When a first request comes from the conversion library module, a secure session can be implemented. The conversion library module can provide the data that is signed and encrypted with the public key. The proxy server can have a private key to decode public key. It is noted that communication from the proxy to the destination server can be implemented with the HTTPS protocol.

Additional example attributes of a cellular network optimized protocol are now provided. The cellular network optimized protocol may not directly utilize a Domain Name System (DNS) server. The cellular network optimized protocol may not an implement a TCP handshake process. The cellular network optimized protocol can implement a more efficient bandwidth probing process. For example, a TCP/HTTP protocol may implement a bandwidth probing technique to obtain an accurate network measurement. In contrast, the conversion library module can query an operating system of the mobile device to determine a current mobile network state (e.g. 2G, 3G, etc.) as the mobile device is periodically probing its current cellular network. Accordingly, the data transmissions using the cellular network optimized protocol need not perform separate bandwidth probing technique (e.g. TCP slow-start probing). Data transmissions using the cellular network optimized protocol can be set based on the transmission speed of the known current cellular network state.

The cellular network optimized protocol can implement a smarter backoff algorithm. For example, when a data packet is dropped in a TCP/HTTP protocol transmission, the TCP/HTTP protocol may restart by again implementing the bandwidth probing process. The cellular network optimized protocol can avoid this conservative TCP/HTTP 'backoff' technique and maintain the higher speed of the currently available cellular network.

Appendix A includes additional information that can be utilized in some embodiments. Appendix B provide additional information in implementing an example cellular network optimized protocol.

ADDITIONAL SYSTEMS AND ARCHITECTURE

Figure 6:
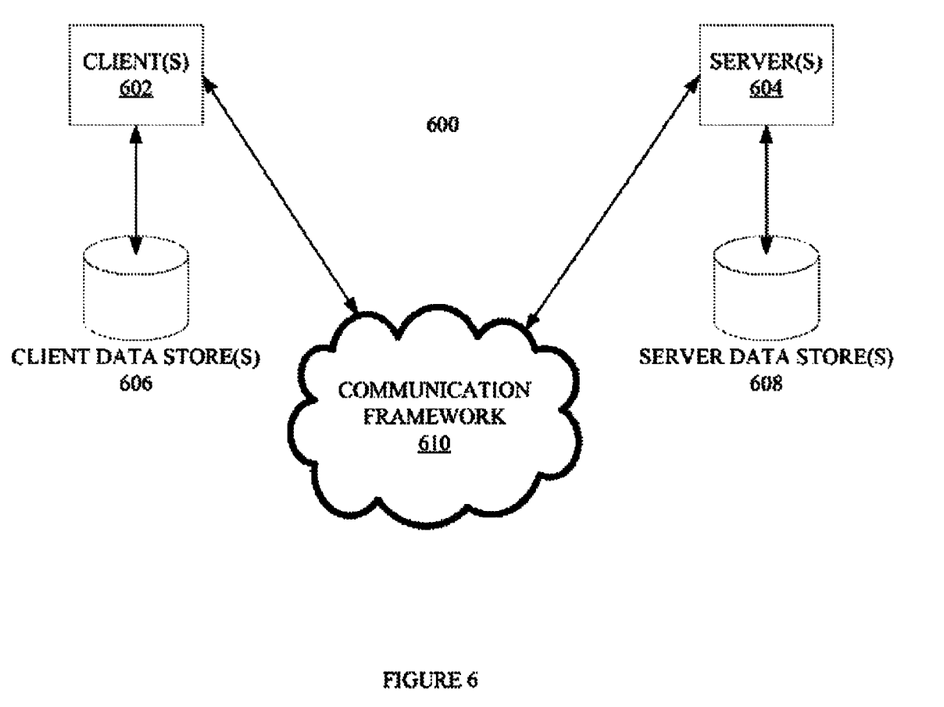
FIG. 6 is a block diagram of a sample computing environment that can be utilized to implement various embodiments.

FIG. 6 is a block diagram of a sample computing environment 600 that can be utilized to implement various embodiments. The system 600 further illustrates a system that includes one or more client(s) 602. The client(s) 602 can be hardware and/or software (e.g., threads, processes, computing devices). The system 600 also includes one or more server(s) 604. The server(s) 604 can also be hardware and/or software (e.g., threads, processes, computing devices). One possible communication between a client 602 and a server 604 may be in the form of a data packet adapted to be transmitted between two or more computer processes. The system 600 includes a communication framework 610 that can be employed to facilitate communications between the client(s) 602 and the server(s) 604. The client(s) 602 are connected to one or more client data store(s) 606 that can be employed to store information local to the client(s) 602. Similarly, the server(s) 604 are connected to one or more server data store(s) 608 that can be employed to store information local to the server(s) 604.

Figure 7:
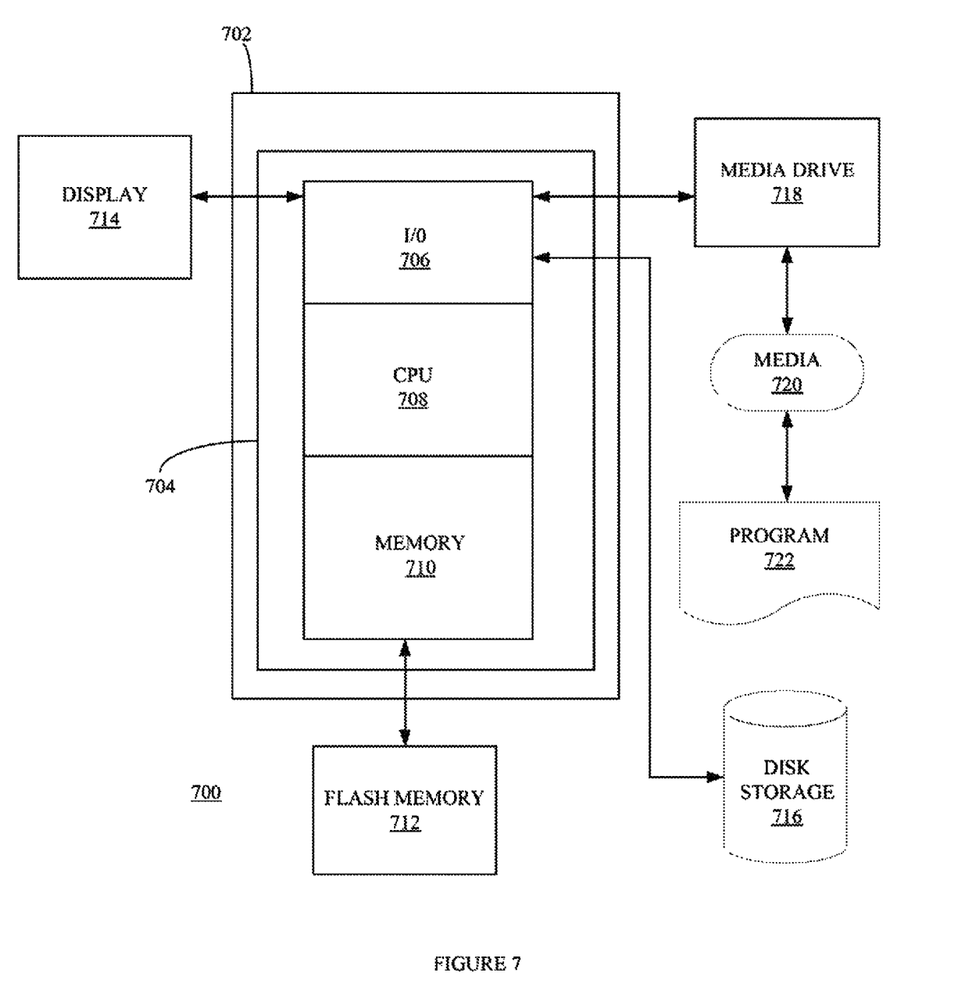
FIG. 7 depicts an exemplary computing system that can be configured to perform any one of the processes provided herein.

FIG. 7 depicts an exemplary computing system 700 that can be configured to perform any one of the processes provided herein. In this context, computing system 700 may include, for example, a processor, memory, storage, and I/O devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform any of the processes described herein. The main system 702 includes a motherboard 704 having an I/O section 706, one or more central processing units (CPU) 708, and a memory section 710, which may have a flash memory card 712 related to it. The I/O section 706 can be connected to a display 714, a keyboard and/or other user input (not shown), a disk storage unit 716, and a media drive unit 718. The media drive unit 718 can read/write a computer-readable medium 720, which can contain programs 722 and/or data. Computing system 700 can include a web browser. Moreover, it is noted that computing system 700 can be configured to include additional systems in order to fulfill various functionalities. Computing system 700 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

ADDITIONAL EXAMPLES

Figure 8:
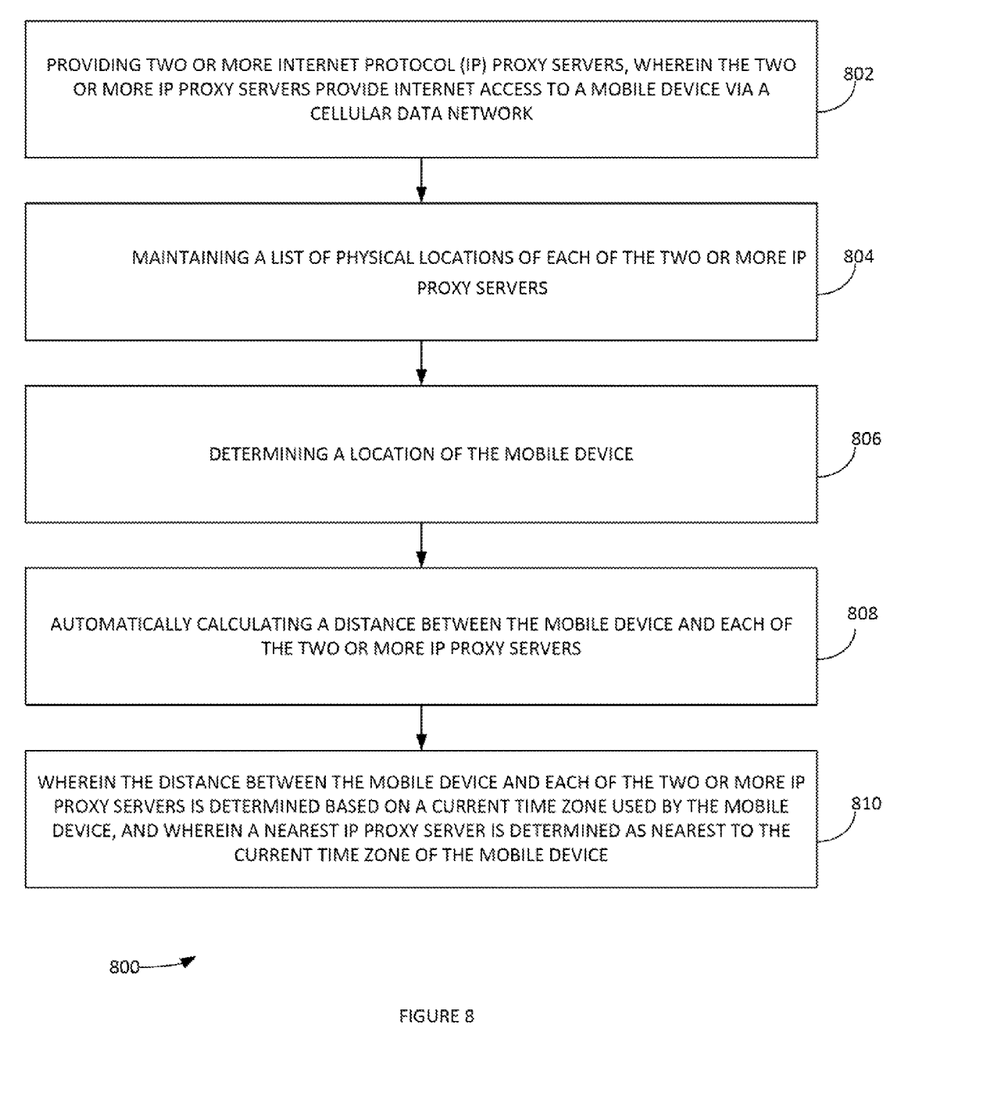
FIG. 8 illustrates an example process for Internet protocol optimization of cellular data network, according to some embodiments.

FIG. 8 illustrates an example process 800 for Internet protocol optimization of cellular data network, according to some embodiments. In step 802 of process 800 two or more interact protocol (IP) proxy servers are provided. The two or more IP proxy servers provide internet access to a mobile device via a cellular data network. In step 804, a list of physical locations of each of the two or more IP proxy servers is generated and maintained. In step 806, a location of the mobile device is determined. In step 808, a distance between the mobile device and each of the two or more IP proxy servers is automatically calculating. In step 810, a nearest IP proxy server to the mobile device is selected. There can be a minimum distance between the mobile device and the nearest IP proxy server. A TCP based protocol request can be sent to the nearest server instead of other, further away, IP proxy. Alternately, the TCP based protocol request can be automatically converted to a cellular-data network protocol request with a mobile device application. The cellular-data network protocol request can be optimized for communicating data packets over a cellular-data network. The cellular-data network protocol request can be sent to the nearest IP proxy server to the mobile device instead of other, farther away, IP proxy servers.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be as non-transitory form of machine-readable medium.

What is claimed as new and desired to be protected by Letters Patent of the United States is:

1. A method comprising:
   providing two or more internet protocol (IP) proxy servers, wherein the two or more IP proxy servers provide internet access to a mobile device via a cellular data network;
   maintaining a list of physical locations of each of the two or more IP proxy servers;
   determining a location of the mobile device;
   automatically calculating a distance between the mobile device and each of the two or more IP proxy servers, wherein the distance between the mobile device and each of the two or more IP proxy servers is determined based on a current time zone used by the mobile device, and wherein a nearest IP proxy server is determined as nearest to the current time zone of the mobile device; and
   selecting a nearest IP proxy server to the mobile device, wherein there is a minimum distance between the mobile device and the nearest IP proxy server.

2. The method of claim 1, wherein the distance between the mobile device and each of the two or more IP proxy servers is determined based on a Global Positioning System (GPS) location of the mobile device, and wherein the nearest IP proxy server is determined as nearest to the current GPS location of the mobile device.

3. The method of claim 1, wherein the distance between the mobile device and each of the two or more IP proxy servers is determined based on a detected local Wi-Fi network location, and wherein the nearest IP proxy server is determined as nearest to the detected local Wi-Fi network location.

4. The method of claim 3 further comprising:
   communicating a network address of the nearest IP proxy server to the mobile device.

5. The method of claim 4, wherein the mobile device automatically converts an transmission control protocol (TCP) based protocol request by a mobile application in the mobile device to a cellular-data network protocol request with an application in the mobile device.

6. The method of claim 5 wherein the cellular-data network protocol is optimized for transmission through a cellular data network.

7. The method of claim 6, wherein the IP proxy server caches a set of web documents, digital images, or any other type of data files.

8. The method of claim 7, wherein access to the IP proxy server is provided on a subscription fee basis.

9. A computerized system comprising:
   a processor configured to execute instructions;
   a memory containing instructions when executed on the processor, causes the processor to perform operations that:
      provide two or more internet protocol (IP) proxy servers, wherein the two or more IP proxy servers provide Internet access to a mobile device via a cellular data network;
      maintain a list of physical locations of each of the two or more IP proxy servers;
      determine a location of the mobile device;
      automatically calculate a physical distance between the mobile device and each of the two or more IP proxy servers, wherein the distance between the mobile device and each of the two or more IP proxy servers is determined based on a current time zone used by the mobile device, and wherein a nearest IP proxy server is determined as nearest to the current time zone of the mobile device; and
      select a nearest IP proxy server to the mobile device, wherein there is a minimum distance between the mobile device and the nearest IP proxy server.

10. The computerized system of claim 9, wherein the physical distance between the mobile device and each of the two or more IP proxy servers is determined based on a Global Positioning System (GPS) location of the mobile device, and wherein the nearest IP proxy server is determined as nearest to the current GPS location of the mobile device.

11. The computerized system of claim 10, wherein the physical distance between the mobile device and each of the two or more IP proxy servers is determined based on a detected local Wi-Fi network location, and wherein the nearest IP proxy server is determined as nearest to the detected local Wi-Fi network location.

12. The computerized system of claim 11, wherein memory containing instructions when executed on the processor, causes the processor to perform operations that:
   communicate a network address of the nearest IP proxy server to the mobile device.

13. A method of an Internet protocol optimization of a cellular data network comprising:
- detecting that a mobile device application in a mobile device has generated a transmission control protocol (TCP) based protocol request;
- automatically converting the TCP based protocol to a cellular-data network protocol request with the mobile device application;
- identifying two or more Internet protocol (IP) proxy servers, wherein the two or more IP proxy servers provide Internet access to a mobile device via a cellular data network;
- generating a list of physical locations of each of the two IP proxy servers;
- calculating a location of the mobile device;
- automatically determining, with at least one processor, a distance between the mobile device and each of the two or more IP proxy servers, wherein the physical distance between the mobile device and each of the two or more IP proxy servers is determined based on looking up the location of the mobile device in an IP geolocation database using a source IP of the mobile device as a key for said lookup;
- selecting a physically nearest IP proxy server of the two or more IP proxy servers to the mobile device; and
- communicating the cellular-data network protocol request to the physically nearest IP proxy server.

14. The method of claim 13 further comprising:
- periodically receiving a network address of the two or more IP proxy servers with the mobile device application.

15. The method of claim 14, wherein the physical distance between the mobile device and each of the two or more IP proxy servers is determined based on a current time zone used by the mobile device, and wherein a nearest IP proxy server is determined as nearest to the current time zone of the mobile device.

16. The method of claim 15 wherein the cellular-data network protocol is optimized for transmission through a cellular data network.

17. The method of claim 16, wherein the IP proxy server caches a set of web documents, and wherein access to the IP proxy server is provided on a subscription fee basis.

* * * * *